United States Patent
Ganev et al.

(10) Patent No.: US 10,965,183 B2
(45) Date of Patent: Mar. 30, 2021

(54) INTEGRATED TRACTION DRIVE SYSTEM

(71) Applicant: Honeywell International Inc., Morris Plains, NJ (US)

(72) Inventors: Evgeni Ganev, Torrance, CA (US); Robert Alan Dietrich, Montebello, CA (US); Steve White, Whittier, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/442,144

(22) Filed: Jun. 14, 2019

(65) Prior Publication Data
US 2020/0395811 A1 Dec. 17, 2020

(51) Int. Cl.
*H02K 5/20* (2006.01)
*H02K 7/116* (2006.01)
(Continued)

(52) U.S. Cl.
CPC .................. *H02K 5/20* (2013.01); *B60K 1/00* (2013.01); *B60L 15/20* (2013.01); *F16H 37/082* (2013.01); *F16H 57/02* (2013.01); *F16H 57/0476* (2013.01); *F16H 57/0483* (2013.01); *F16H 57/0486* (2013.01); *H02K 7/003* (2013.01);
(Continued)

(58) Field of Classification Search
CPC ........ H02K 5/20; H02K 11/215; H02K 11/33; H02K 7/003; H02K 7/116; H02K 9/19; H02K 9/22; B60K 1/00; B60K 2001/006; B60L 15/20; F16H 37/082; F16H 57/02;
(Continued)

(56) References Cited

U.S. PATENT DOCUMENTS 4,418,777 A 12/1983 Stockton
5,585,681 A 12/1996 Bitsche
(Continued)

FOREIGN PATENT DOCUMENTS

CN 207664816 U 7/2018
DE 102015220852 A1 * 4/2017 ............ H02K 9/197
(Continued)

OTHER PUBLICATIONS

Machine translation of DE102015220852 filed Jul. 18, 2020 (Year: 2020).*

(Continued)

*Primary Examiner* — Tisha D Lewis
(74) *Attorney, Agent, or Firm* — Shumaker & Sieffert, P.A.

(57) ABSTRACT

A traction drive system for a vehicle includes a housing, a high-speed motor, a motor controller, a transmission, a cooling system, and a lubricating oil system. The housing defines a motor cavity, an electronics cavity, an oil cavity, and a cooling fluid cavity. The cooling fluid cavity is thermally coupled to each of the motor, electronics, and oil cavities. The high-speed motor is substantially within the motor cavity and coupled to a lubricating oil system fluidically coupled to the oil cavity. The motor controller includes electronics within the electronics cavity. The transmission is mechanically coupled to the high-speed motor and coupled to the lubricating oil system fluidically coupled to the oil cavity. The cooling system is fluidically coupled to the cooling fluid cavity and configured to cool the high-speed motor, the motor controller, and the lubricating oil system.

19 Claims, 6 Drawing Sheets

(51) Int. Cl.
  *H02K 9/19* (2006.01)
  *H02K 9/22* (2006.01)
  *F16H 57/02* (2012.01)
  *B60L 15/20* (2006.01)
  *F16H 37/08* (2006.01)
  *B60K 1/00* (2006.01)
  *F16H 57/04* (2010.01)
  *H02K 11/33* (2016.01)
  *H02K 11/215* (2016.01)
  *H02K 7/00* (2006.01)

(52) U.S. Cl.
  CPC ............... *H02K 7/116* (2013.01); *H02K 9/19* (2013.01); *H02K 9/22* (2013.01); *H02K 11/215* (2016.01); *H02K 11/33* (2016.01); *B60K 2001/006* (2013.01); *F16H 2057/02034* (2013.01)

(58) Field of Classification Search
  CPC ............. F16H 57/0476; F16H 57/0483; F16H 57/0486; F16H 2057/02034
  See application file for complete search history.

(56) References Cited

U.S. PATENT DOCUMENTS

| | | | |
|---|---|---|---|
| 5,939,806 A | 8/1999 | Kim et al. | |
| 6,198,183 B1 | 3/2001 | Baeumel et al. | |
| 6,616,059 B2 | 9/2003 | Sabhapathy et al. | |
| 6,700,236 B2 | 3/2004 | Umeda et al. | |
| 7,030,520 B2 | 4/2006 | Takenaka et al. | |
| 7,295,440 B2 | 11/2007 | Ganev et al. | |
| 7,315,099 B2 | 1/2008 | Steffen et al. | |
| 9,768,672 B2 | 9/2017 | Mohr | |
| 2006/0081800 A1* | 4/2006 | Riester | F16K 31/05 251/129.01 |
| 2007/0007055 A1* | 1/2007 | Schmidt | H02K 11/0094 180/65.235 |
| 2007/0142139 A1* | 6/2007 | Leichter | H02K 5/18 474/1 |
| 2013/0054058 A1* | 2/2013 | Hawkins | B60T 1/10 701/22 |
| 2013/0061703 A1* | 3/2013 | Teramoto | F16H 55/14 74/434 |
| 2014/0333161 A1* | 11/2014 | Knoblauch | H02K 1/32 310/54 |
| 2018/0170187 A1 | 6/2018 | Yang et al. | |
| 2018/0175679 A1 | 6/2018 | Seo et al. | |
| 2018/0262089 A1 | 9/2018 | Hatch | |
| 2019/0229582 A1* | 7/2019 | Ito | F16H 57/0441 |
| 2020/0149534 A1* | 5/2020 | Wetterau | H02K 7/116 |

FOREIGN PATENT DOCUMENTS

| | | | | |
|---|---|---|---|---|
| DE | 102018209340 B3 * | 4/2019 | ........... | F16H 57/043 |
| EP | 2543531 A1 | 1/2013 | | |
| JP | H05292703 A | 11/1993 | | |
| WO | 0235898 A1 | 5/2002 | | |
| WO | 2012064276 A1 | 5/2012 | | |

OTHER PUBLICATIONS

Laskaris et al., "Liquid cooled permanent-magnet traction motor design considering temporary overloading," ICEM2012, Sep. 2012, 18 pp.

Paine et al., "Design and Comparative Analysis of a Retrofitted Liquid Cooling System for High-Power Actuators," Actuators, ISSN: 2076-0825, Aug. 2015, 52 pp.

Communication with Extended European Search Report from counterpart European Application No. 20178137.4, dated Oct. 12, 2020, 8 pp.

Response to Extended European Search Report dated Oct. 12, 2020, from counterpart European Application No. 20178137.4, filed Dec. 1, 2020, 15 pp.

* cited by examiner

INTEGRATED TRACTION DRIVE SYSTEM

TECHNICAL FIELD

The present disclosure relates to electric drive systems.

BACKGROUND

An electric drive system may be used for propulsion of an electric vehicle. A conventional electric drive system contains various drive components including a motor that provides electric drive power, a transmission that converts the electric drive power to a desired speed and torque, and a motor controller that controls the motor to put the desired electric drive power. Design of an electric drive system includes selection of the various drive components based on desired specifications, such that the resulting drive system includes an assembled combination of the various drive components in which the combined functions of the various components operate to produce the desired speed and torque. As such, each of the components of an electric drive system may be designed with accessory systems and structural characteristics directed toward the respective component. For example the various components may be subject to substantial amounts of heat load. To remove this heat, each of the components may include thermal designs and cooling circuits for heat rejection.

SUMMARY

In some examples, the disclosure describes a traction drive system for a vehicle that includes a housing, a high-speed motor, a motor controller, a transmission, a lubricating oil system, and a cooling system. The housing defines a motor cavity, an electronics cavity, an oil cavity, a transmission cavity, and a cooling fluid cavity. The cooling fluid cavity is thermally coupled to each of the motor cavity, electronics cavity, and oil cavity. The high-speed motor is substantially within the motor cavity. The motor controller includes electronics within the electronics cavity and configured to control a speed of the motor. The transmission is substantially within the transmission cavity and mechanically coupled to the high-speed motor. The oil cavity is configured to fluidically couple to the lubricating oil system. The lubricating system is configured to supply lubricating oil to the motor and the transmission. The cooling fluid cavity is configured to fluidically couple to the cooling system. The cooling system is configured to cool the high-speed motor, the motor controller, and the lubricating oil system.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

This disclosure is directed toward integrated traction drive systems. As mentioned above, conventional traction drive systems may be configured as a combination of separate components that are each individually designed to provide a particular function. As a result, these conventional traction drive systems may include inefficiencies such as redundant components, suboptimal thermal management, and relatively large size and weight.

According to principles of the disclosure, integrated traction drive systems described herein may have lower weight, smaller size, and/or reduced cost compared to conventional traction drive systems. Example traction drive systems may include a housing that is configured to house a motor, motor controller, and transmission in a single chassis. The housing may include cooling channels configured to remove heat from the motor, the motor controller, and lubricating oil system of the motor and transmission. The motor may operate at a high speed, resulting in a corresponding reduced size, while the transmission may include multiple stages to convert the high-speed output of the motor to a reduced speed and increased torque for powering a vehicle. In this way, integrated traction drive systems may offer a more compact and/or inexpensive design for electric vehicles.

Figure 1A:
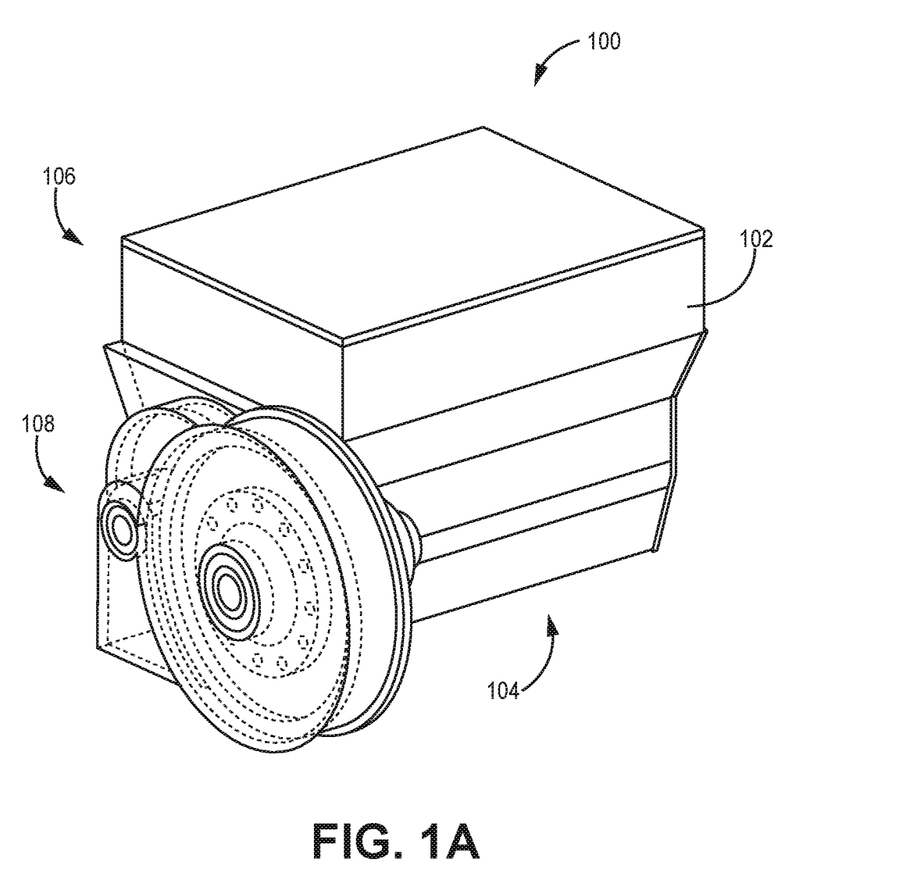
FIG. 1A is a perspective view diagram illustrating an example traction drive system.

FIG. 1A is a perspective view diagram illustrating an example traction drive system 100. Traction drive system 100 includes a housing 102, a motor 104, a motor controller 106, and a transmission 108. Housing 102 is configured to compactly integrate motor 104, motor controller 106, and transmission 108 in a single chassis. For example, as explained above, conventional traction drive systems may be designed in such a way that the various drive system components are arranged separately and utilize separate accessory systems, such as cooling systems and circuits. As will be further described in FIG. 1B below, housing 102 may integrate motor 104, motor controller 106, and transmission 108 in such a way that structural features, such as walls, and functional features, such as accessory systems, are integrated. In this way, traction drive system 100 may have reduce weight, volume, and cost.

Motor 104 is configured produce electrical drive power. Motor 104 is a high-speed motor configured to operate at a shaft speed greater than about 10,000 revolutions per minute (RPM). For example, a motor configured to operate at a higher shaft speed may produce a desired power at a lower torque and correspondingly smaller diameter, volume, and/or weight. At a same time, other components of traction drive system 100, such as motor controller 106 and transmission 108, may not substantially increase in size or weight, such that a total weight, volume, and/or cost of traction drive system 100 may be reduced for operation of motor 104 at a higher speed.

In some examples, motor 104 may be configured to operate at high shaft speeds. In some instances, a high shaft speed may be a shaft speed greater than about 15,000 RPM, such as 30,000 RPM or 60,000 RPM. For example, as shown in Table 1 below, configuration of traction drive system 100 for a speed of 30,000 RPM may result in substantially smaller volume and diameter without a substantial reduction in efficiency. In some examples, motor 104 has a diameter less than 25 centimeters, such as less than 20 centimeters. For example, as a speed of motor 104 increases, a size of stators and/or rotors of motor 104 decreases, such that a diameter of motor 104 across an axis of the shaft of motor 104 may be reduced. In some examples, motor 104 has a volume less than 15 liters, such as less than 10 liters. For example, a decrease in diameter of motor 104 may result in a corresponding decrease in a volume of motor 104.

In addition to a reduced size and/or weight, high-speed motor 104 may operate at a higher torque to inertia ratio than a motor configured to operate at a lower shaft speed. For example, while a torque of motor 104 may be lower than a corresponding lower speed motor, motor 104 may have a lower shaft and rotor weight resulting in reduced inertia. As a result, a vehicle operating with traction drive system 100 may have a higher acceleration compared to a vehicle operating with a traction drive system with a motor output having a higher torque and lower speed. In some examples, motor 104 may be constructed from lightweight and/or highly thermally conductive materials, such as aluminum.

Motor controller 106 includes electronics configured to operate motor 104 at a high speed. Motor controller 106 may be communicatively coupled to and configured to control components of motor 104. For example, motor controller 106 may be configured to manage operation of components of motor 104 based on operational inputs for motor 104, such as speed control setpoints, and feedback from motor 104, such as speed measurements. Motor controller 106 may include any suitable arrangement of hardware, software, firmware, or any combination thereof, to perform the operations attributed to motor controller 106 that are described herein including any one or more microprocessors, digital signal processors (DSPs), application specific integrated circuits (ASICs), field programmable gate arrays (FPGAs), or any other equivalent integrated or discrete logic circuitry, as well as any combinations of such components. In some examples, motor controller 106 is configured to operate high-speed motor 104 at a maximum speed between about 12,000 and about 60,000 RPM. For example, as explained above, operation of motor 104 by motor controller 106 at a high speed may require a smaller torque, such that motor 104 may be designed with reduced weight, volume, and cost.

Transmission 108 is mechanically coupled to high-speed motor 104 and configured to convert power received from a shaft of motor 104 to an output shaft having a reduced speed and increased torque suitable for driving axles of a vehicle. For example, traction drive system 100 may be used in electric vehicles configured to drive axles at a speed that is substantially below the shaft speed of motor 104, such that an output speed may be reduced, and an output torque may be increased. In some examples, transmission 108 has a gear ratio between about 12:1 and about 60:1, such as between about 20:1 and about 45:1. For example, a gear ratio of transmission 108 may be dependent on a speed of motor 104, such that motor 104 having a speed of 30,000 RPM may be coupled to a corresponding transmission 108 having a gear ratio of between about 20:1 to about 30:1, while a motor 104 having a speed of 60,000 RPM may be coupled to a corresponding transmission 108 having a gear ratio of between about 30:1 to about 60:1. In some examples, transmission 108 includes multiple stages of speed reduction and torque amplification. For example, traction drive system 100 may be configured for various characteristics, such as performance characteristics (tip speed, gear wear, power at certain shaft speeds, higher overall power across a range of shaft speeds) or specifications (lower overall size, weight, and/or cost). As such, a number and/or gear ratio of stages of speed reduction and torque amplification may be selected such that an overall size, weight, and/or cost of transmission 108 is reduced or a particular performance characteristic (e.g., a shape of a power curve) may be achieved.

Figure 1B:
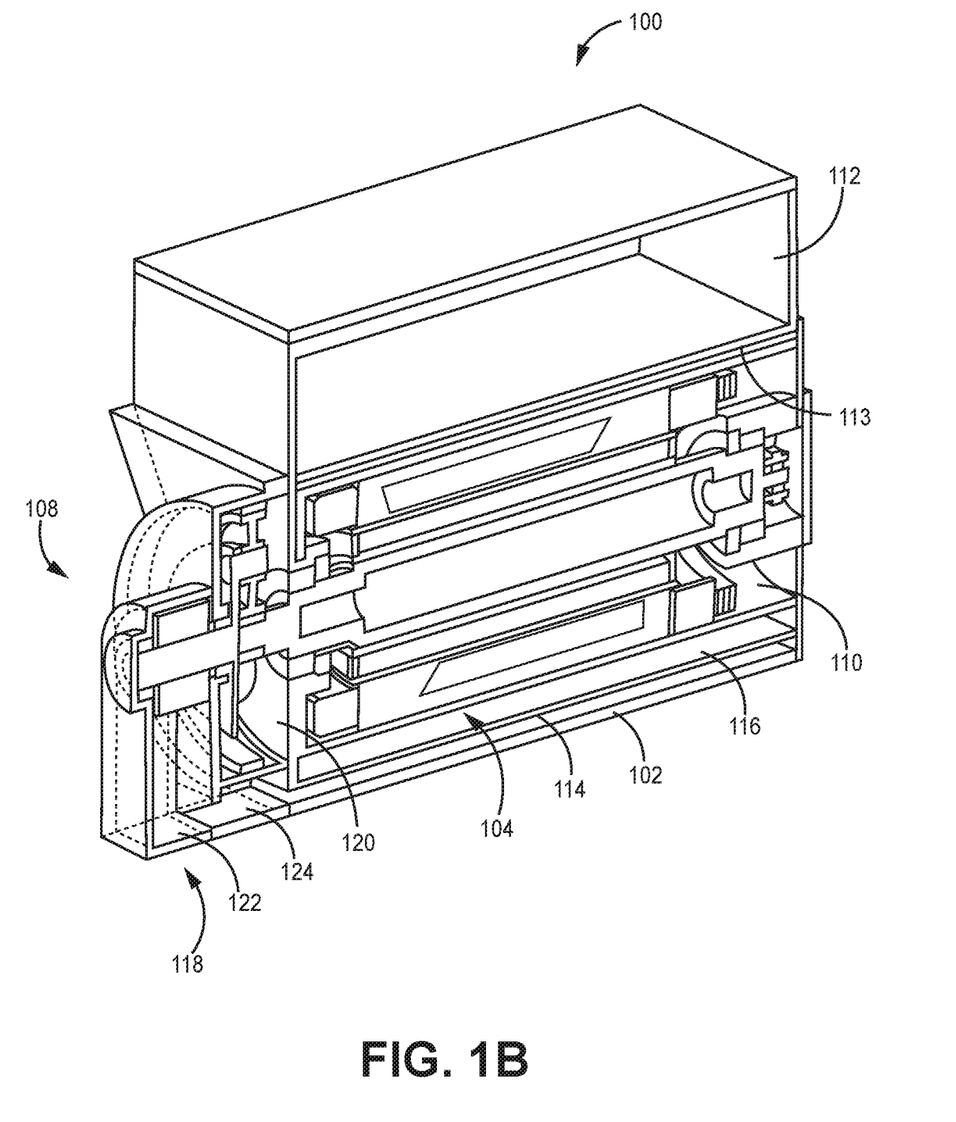
FIG. 1B is a perspective view, vertical cross-sectional diagram illustrating the example traction drive system of FIG. 1A.

In addition to component selection, traction drive systems discussed herein may include structural features that integrate a form and/or function of various components of the traction drive systems. For example, integrated traction drive systems discussed herein may have improved thermal management by consolidating walls of various components and providing a single cooling source for components of the traction drive systems. FIG. 1B is a perspective view, vertical cross-sectional diagram illustrating the example traction drive system of FIG. 1A that includes various structural features that integrate various components and/or functions of traction drive system 100. Housing 102 is configured with various cavities for containing components of traction drive system 100 in a predetermined configuration. The predetermined configuration of these cavities may include structural interfaces, such as shared walls between cavities, for reduced weight and/or may include cooling interfaces, such as a shared cooling circuit distributed throughout housing 102, for removing heat from the various components of traction drive system 100 contained in the cavities.

In the example of FIG. 1B, housing 102 defines a motor cavity 110, an electronics cavity 112, an oil cavity 114, a cooling fluid cavity 116, and a transmission cavity 118. Each cavity of housing 102 may be bounded by a plurality of walls. In some instances, one or more walls of the plurality of walls may be shared between more than one cavity. For example, motor cavity 110 and transmission cavity 118 may share a common wall, such that an amount of material is reduced compared to traction drive systems that do not include an integrated housing. Housing 102 may further include a proximal end bell configured to enclose transmission 108 at a proximal end of traction drive system 100 and a distal end bell configured to enclose motor 104 at a distal end of traction drive system 100.

Motor cavity 110 is configured to house motor 104. For example, motor cavity 110 may be sized such that components of motor 104 are contained substantially within motor cavity 110. In the example of FIG. 1B, motor cavity 110 shares a wall with cooling fluid cavity 116. This wall between motor cavity 110 and cooling fluid cavity 116 may operate as a thermal interface between components of motor 104 in motor cavity 110 and a cooling fluid in cooling fluid cavity 116. For example, as shown in FIG. 1B, stators of motor 104 are coupled to a wall of motor cavity 110, such that heat produced by the stators is transferred to the wall of motor cavity 110. In the example of FIG. 1B, motor cavity 110 also shares a wall with transmission cavity 118. This shared wall may operate as a common structural interface between components of motor 104 in motor cavity 110 and components of transmission 108 in transmission cavity 118, such that an amount of material is reduced compared to traction drive systems in which a motor and a transmission are contained within separate housings.

Electronics cavity 112 is configured to house motor controller 106 (not shown). As illustrated in FIG. 1B, electronics cavity 112 is positioned at a top of housing 102. Electronics cavity 112 is bounded by a cold plate (or wall) 113 at an interface between with cooling fluid cavity 116 and electronics cavity 112. Electronics of motor controller 106 that produce and dissipate large amounts of heat may be thermally coupled to cold plate 113, such as directly contacting cold plate 113 or adhered to cold plate 113 through a thermal adhesive. Cold plate 113 is configured to transfer heat from electronics of motor controller 106 to cooling fluid in cooling fluid cavity 116. In this way, components with a high heat load may receive increased cooling from cooling fluid of cooling fluid cavity 116.

Oil cavity 114 is configured to contain lubricating oil from various components. For example, in contrast to oil used for lubrication in internal combustion engines, oil used for lubrication in electric motors may have properties configured for longer service life and less frequent replacement. As such, an oil used to lubricate various parts of motor 104 may be the same as an oil used to lubricate various parts of transmission 108.

In the example of FIG. 1B, a lubricating oil system (not shown) is fluidically coupled to oil cavity 114 and configured to supply lubricating oil to various components of motor 104, such as bearings of motor 104, to lubricate and/or cool the various components and return lubricating oil to oil cavity 114. In a similar way, the lubricating oil system is fluidically coupled to transmission oil cavity 124 through oil cavity 114 and configured to supply lubricating oil to various components of transmission 108, such as gears and bearings, to lubricate and/or cool the various components and return lubricating oil to oil cavity 114 through transmission oil cavity 124. In this way, motor 104 and transmission 108 may include a lubricating oil system capable of being cooled by a same cooling system. The lubricating oil system may include a variety of components including, but not limited to: a pressure source, such as a lubricating oil pump; filtration components, such as an oil filter; and the like. For example, a lubricating oil pump may be fluidically coupled to oil cavity 124 and configured to pump lubricating oil through different parts of motor 104 and transmission 108. In some examples, the lubricating oil system may include dispersion components, such as sprayers, such as for spraying lubricating oil on gears of transmission 108 and bearings of motor 104. The lubricating oil system may operate as an integrated oil system, which may be integrated into housing 102. The lubricating oil system may include a pressure source In the example of FIG. 1B, oil cavity 114 is positioned at a bottom of traction drive system 100, such that lubricating oil may return to oil cavity 114 through gravity. Oil cavity 114 shares a wall with cooling fluid cavity 116. This shared wall between oil cavity 114 and cooling fluid cavity 116 acts as a thermal interface between lubricating oil in oil cavity 114 and cooling fluid in cooling fluid cavity 116. In this way, traction drive system 100 may cool lubricating oil for both motor 104 and transmission 108 without using an additional cooling system for each component, such as a heat exchanger for the lubricating oil system.

Transmission cavity 118 is configured to house transmission 108 substantially within transmission cavity 118. As shown in FIG. 1B, transmission cavity 118 further includes a first stage cavity 120 configured to house a first stage gear assembly, a second stage cavity 122 configured to house a second stage gear assembly and a differential, and a transmission oil cavity 124. Transmission oil cavity 124 is fluidically coupled to various cavities of transmission cavity 118 and oil cavity 114, such that lubricating oil from transmission cavity 118 may pass through transmission oil cavity 124 to oil cavity 114. In the example of FIG. 1B, transmission oil cavity 124 is positioned at a bottom of traction drive system 100, such that lubricating oil from transmission cavity 118, such as first stage cavity 120, second stage cavity 122, and transmission oil cavity 124 may return to oil cavity 114 due to gravity.

Cooling fluid cavity 116 is thermally coupled to each of motor cavity 110, electronics cavity 112, oil cavity 114, and transmission cavity 118. Cooling fluid cavity 116 may be thermally coupled to each cavity by sharing a thermal interface with the respective cavity, such that heat may transfer from a component or fluid of the respective cavity through the thermal interface to cooling fluid in cooling fluid cavity 116. In the example of FIG. 1B, cooling fluid cavity 116 shares a thermal interface with motor cavity 110, electronics cavity 112, oil cavity 114, transmission cavity 118, transmission oil cavity 124 via oil cavity 114. Cooling fluid cavity 116 is configured to receiving cooling fluid from a cooling system, contain the cooling fluid to receive heat from components of traction drive system 100, and return the cooling fluid back to the cooling system. A variety of cooling fluids could be used including, but not limited to, refrigerants and the like. In this way, housing 102 is configured to permit cooling of various components of a traction drive system 100. While not shown, in some examples, housing 102 may further include cooling passages formed in interfaces between cavities for various components and cooling fluid cavity 116.

Cooling fluid cavity 116 may include a variety of designs and sizes. In some examples, cooling fluid cavity 116 may be configured to provide different degrees of cooling to different components of traction drive system 100 based on an anticipated heat load from the respective component. For example, motor 104 may have a higher heat load than the lubricating oil system, such that cooling fluid cavity 116 may be sized and/or shaped so that a greater amount of cooling is provided to motor 104 than the lubricating oil system. In some examples, cooling fluid cavity 116 is configured such that thermal interfaces of cooling fluid cavity 116 shared with the various components may correspond to a heat load produced by the respective component. For example, a surface area of a thermal interface between cooling fluid cavity 116 and motor cavity 110 may be greater than a surface area of a thermal interface between cooling fluid cavity 116 and oil cavity 114. In some examples, cooling fluid cavity 116 may include more than one chamber or channel. For example, cooling fluid cavity 116 may include various chambers sized for particular flow rates, residence times, or other properties related to cooling provided by a respective chamber. In some examples, cooling fluid cavity 116 has a smallest effective thickness between about 0.25 centimeter and about 2 centimeters.

While not shown in FIG. 1B, a cooling system may be fluidically coupled to cooling fluid cavity 116 and configured to cool high-speed motor 104, motor controller 106, and the lubricating oil system. For example, the cooling system may circulate cooling fluid through cooling fluid cavity 116. Heat generated from motor 104 may be transferred, directly from motor cavity 110 or indirectly via the lubricating oil system through oil cavity 114, to cooling fluid cavity 116; heat generated from motor controller 106 may be transferred from electronics cavity 112 to cooling fluid cavity 116; and heat generated from transmission 108 may be transferred via the lubricating oil system through transmission oil cavity 124 and oil cavity 114 to cooling fluid cavity 116. The cooling system may include a variety of components including, but not limited to, a pump for pumping cooling fluid through cooling fluid cavity 116, tubing for connecting the pump to cooling fluid cavity 116, a controller and corresponding electrical connections for controlling the flow rate and pressure of the pump, and the like.

While not shown, in some examples, housing 102 may include one or more electrical interfaces embedded in housing 102. The electrical interfaces may be configured to electrically couple various drive components of traction drive system 100. For example, electrical interfaces may provide an electrical connection between stators of motor 104 and motor controller 106 through bus bars. By including embedded electrical interfaces, housing 102 may reduce or eliminate connectors and cables to reduce a cost, weight, volume, and/or reliability of traction drive system 100.

In this way, traction drive system 100 may integrate the various drive components of traction drive system 100 into a single housing 102 capable of cooling the various components using cooling fluid cavity 116 to achieve a better thermal behavior of traction drive system 100 and/or a lower weight of traction drive system 100. For example, use of a single cooling fluid system and cooling fluid cavity 116 may result in less weight than a traction drive system that includes more than one cooling system and a cooling circuit for the various drive components. As another example, use of a single cooling fluid system and cooling fluid cavity 116 may reduce thermal spikes of the various drive components. As yet another example, use of an integrated housing may improve heat transfer between the various drive components, such that a more moderated thermal behavior may be achieved.

Figure 1C:
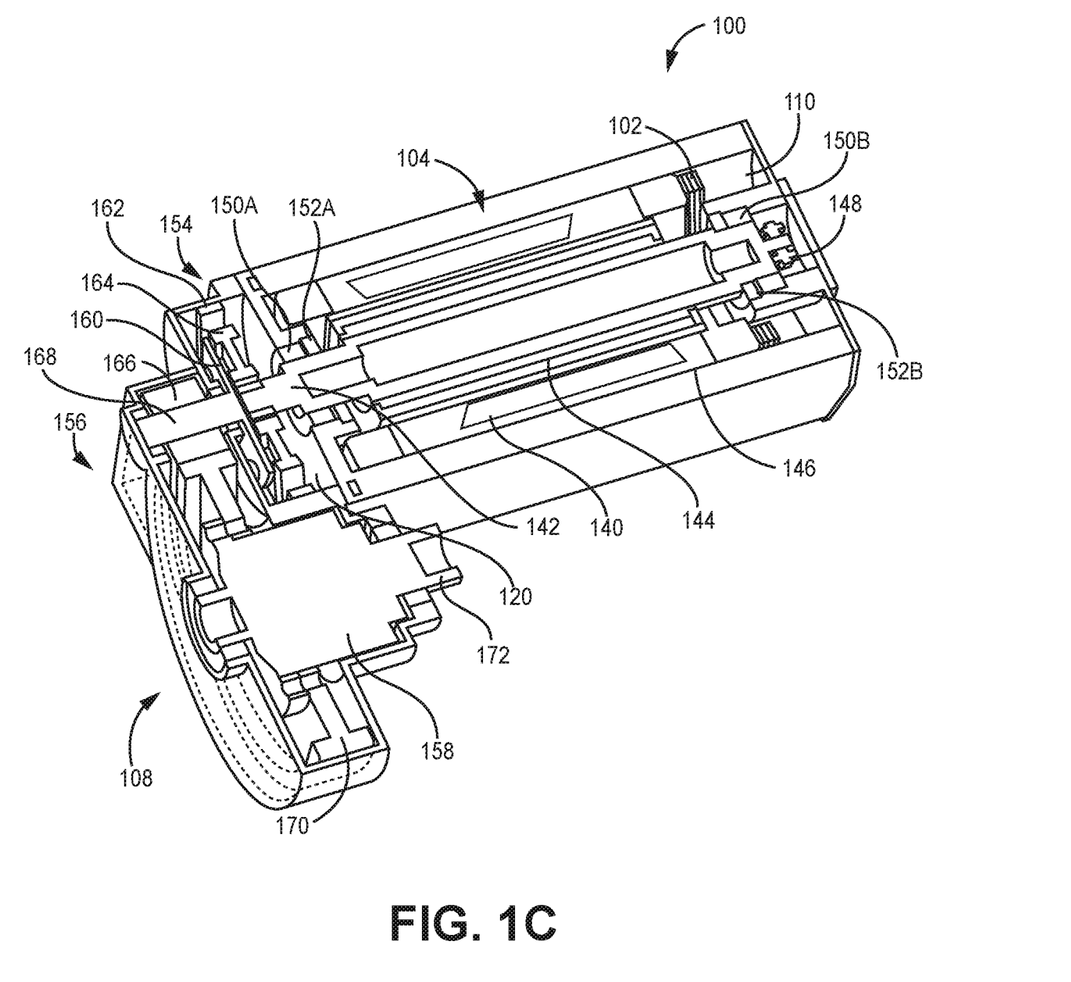
FIG. 1C is a perspective view, horizontal cross-sectional diagram illustrating the example traction drive system of FIG. 1A.

In addition to features of the housing directed toward reduced weight and/or improved thermal management, traction drive systems discussed herein may include a variety of other features directed toward improved performance and/or specifications. FIG. 1C is a perspective view, horizontal cross-sectional diagram illustrating the example traction drive system of FIG. 1A that include various features directed toward reducing size, cost, and/or weight.

High-speed motor 104 includes a motor stator 140, a motor shaft 142, and a motor rotor 144 coupled to motor shaft 142. Motor 104 includes phase and neutral bus bars 257 for winding connections and interfaces. In some examples, components of motor 104 may be configured to reduce a weight of motor 104. In the example of FIG. 1C, motor shaft 142 includes a hollow cavity to reduce weight of motor shaft 142 and decrease inertia of motor shaft 142, such that motor 104 may have increased acceleration. Motor stator 140, motor shaft 142, and/or motor rotor 144 may be sized for a high speed for a particular electric drive power. In some examples, motor rotor 140 and motor shaft 142 may have a diameter less than about 10 centimeters, such as between about 5 centimeters and about 10 centimeters. In some examples, motor stator 140 may have a thickness less than about 2 centimeters.

Motor stator 140 may be coupled to a wall of motor cavity 110. In some examples, motor stator 140 is positioned in motor cavity 110 in an interference fit with intimate or close contact between motor stator 140 and a wall of motor cavity 110. An interference fit may improve mechanical structure and increase heat transfer efficiency.

Motor 104 may include a variety of instrumentation. In some examples, motor 104 includes a resolver 148 coupled to motor shaft 142. Resolver 148 may be configured to measure a position of motor shaft 142, such as through magnets. Resolver 148 may be communicatively coupled to motor controller 106 and configured to transmit a position measurement to motor controller 106 such that motor controller 106 may determine a speed of motor shaft 142.

In some examples, high-speed motor 104 includes a proximal motor bearing 150A at a proximal portion of motor shaft 142 and a distal motor bearing 150B at a distal portion of motor shaft 142. Each of proximal and distal motor bearings 150A and 150B (referred to singularly as "motor bearing 150" and collectively as "motor bearings 150") may be lubricated by oil spray. For example, the lubricating oil system may lubricate motor bearings 150.

In some examples, high-speed motor 104 includes a proximal shaft seal 152A around motor shaft 152 between proximal motor bearing 150A and a proximal end of motor rotor 144 and a distal shaft seal 152B around motor shaft 152 between distal motor bearing 150B and a distal end of motor rotor 144. Each of proximal and distal shaft seals 152A and 152B (referred to singularly as "shaft seal 152" and collectively as "shaft seals 152") may prevent oil penetration into an air gap of motor 104 in motor cavity 110. For example, oil may be contained proximal to proximal shaft seal 152A and distal to distal shaft seal 152B. In some examples, high-speed motor 104 may not include seals, such that lubricating oil may contact portions of motor 104 between bearings 150.

In the example of FIG. 1C, transmission 108 includes a first stage gear assembly 154 coupled to high-speed motor 104, a second stage gear assembly 156 coupled to first stage gear assembly 154, and a differential 158 coupled to second stage gear assembly 156. Transmission 108 is configured to receive electric drive power from motor shaft 142 and convert the electric drive power to an output shaft 172 having a reduced speed and amplified torque. In some examples, gears of transmission 108 may be manufactured from a high strength material, such as carbon steel.

First stage gear assembly 154 is mechanically coupled to high-speed motor 104 through motor shaft 142. First stage gear assembly 154 is configured for a first stage of speed reduction and torque amplification. In some examples, a gear ratio of first stage gear assembly 154 is between about 4:1 and about 10:1. In some examples, first stage gear assembly 154 is a planetary gear assembly. The planetary gear assembly includes a planetary sun gear 160 coupled to motor shaft 142, a planetary ring gear 162 coupled to housing 102, and a plurality of planet gears 164 coupled to a carrier shaft 168 and configured to interface with planetary sun gear 160 and planetary ring gear 162. Such configuration of first stage gear assembly 154 may reduce an audible noise and improve performance of motor 104.

Second stage gear assembly 156 is mechanically coupled to first stage gear assembly 154 through carrier shaft 168. Second stage gear assembly 156 is configured for a second stage of speed reduction and torque amplification. In some examples, a gear ratio of second stage gear assembly 156 is between about 3:1 and about 6:1. In some examples, second stage gear assembly 156 is a helical gear assembly. The helical gear assembly includes a primary gear 166 coupled to carrier shaft 168 and a differential ring gear 170 coupled to differential 158 and configured to interface with primary gear 166. In some examples, a gear ratio of first stage gear assembly 154 is higher than a gear ratio of second stage gear assembly 156.

Differential 158 is mechanically coupled to second stage gear assembly 156 through differential ring gear 170. Differential 158 is configured to transfer torque to one or more axles through output shaft 172. In examples in which traction drive system 100 is part of an electric vehicle, output shaft 172 may be coupled to axles of the electric vehicle, such that the speed and torque of output shaft 172 may represent a speed and power transferred by the axles to wheels of the electric vehicle.

Figure 1D:
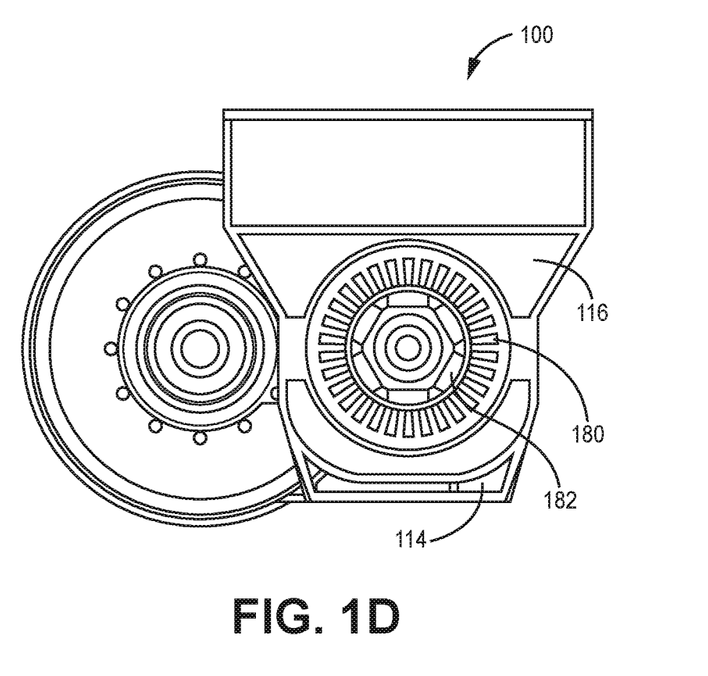
FIG. 1D is a side view, radial cross-sectional diagram illustrating the example traction drive system of FIG. 1A.

As mentioned above, traction drive systems discussed herein may have motors configured to operate at high speeds. FIG. 1D is a side view, radial cross-sectional diagram illustrating the example traction drive system 100 of FIG. 1A that includes a motor configured to operate at about 30,000 RPM. In the example of FIG. 1D, motor rotor 144 comprises a six-pole surface magnet arrangement that includes six motor magnets 182 and distributed motor slots 180; however, in other examples, motor rotor 144 may include a multi-pole surface magnet arrangement having any plurality of poles. Also shown in FIG. 1D are oil cavity 114 and cooling fluid cavity 116. While FIG. 1D illustrates a motor rotor having external magnets, in other examples, motor rotors may have internal magnets.

Traction drive systems discussed herein that utilize high-speed motors may have a reduced weight, volume, and/or cost. Table 1 illustrates various properties for three different speeds—12,000 RPM (12 KRPM), 30 KRPM, and 60 KRPM—of a motor, such as motor 104 of FIGS. 1A-1D.

TABLE 1

| Component | Property | 12 KRPM | 30 KRPM | 60 KRPM |
|---|---|---|---|---|
| Motor | Weight (kg) | 42 | 29.3 | 23 |
| | Volume (L) | 11.0 | 7.2 | 5.1 |
| | Diameter (mm) | 203 | 168 | 139 |
| | Efficiency (%) | 94.6 | 96.0 | 95.8 |
| Controller | Weight (kg) | 9.3 | 9.3 | 9.3 |
| | Volume (L) | 10.2 | 10.2 | 10.2 |
| Housing, Gearbox, Shaft, and Bearings | Weight (kg) | 43.7 | 43.7 | 41.7 |
| Total | Weight (kg) | 95 | 82.3 | 74 |
| Difference | Weight (kg) | 0 | −12.7 | −21 |

As shown in Table 1, a weight of the motor decreases as a speed of the motor increases. For example, a traction drive system having a 30 KRPM motor has a weight reduction of 13.4% from the 12 KRPM motor, while a traction drive system having the 60 KRPM motor has a weight reduction of 22.1% from the 12 KRPM motor.

As such, traction drive systems discussed herein may have a total system weight that substantially decreases with increasing speed of the motor; motor weight and volume that substantially decreases with increasing speed of the motor; motor diameter that substantially decreases with increasing speed of the motor; cost of materials that substantially decreases with increasing speed due to reduced amount of material; motor efficiency that remains substantially the same at different speeds of the motor; motor controller weight that is substantially independent of speed of the motor; and various drive component weights of housing, transmission, and other engine parts that are substantially independent of speed of the motor.

Figure 2:
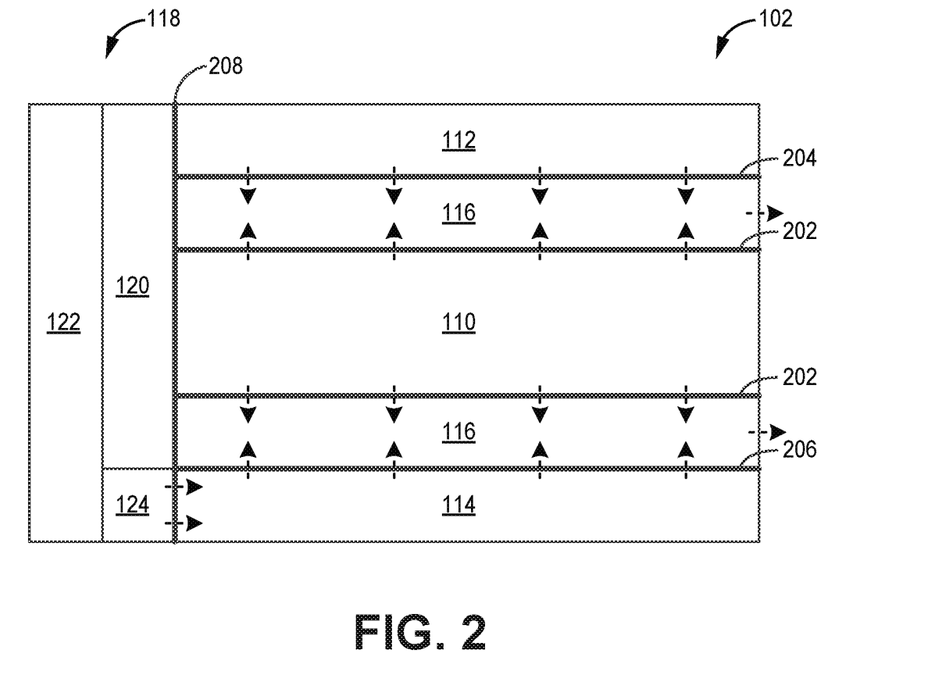
FIG. 2 is a conceptual diagram illustrating an example housing for a traction drive system.

FIG. 2 is a conceptual cross-sectional diagram illustrating an example housing 102 for a traction drive system that includes various thermal and structural interfaces. Various cavities of housing 102 may correspond with housing 102 of FIGS. 1A-1D, such as motor cavity 110, electronics cavity 112, oil cavity 114, cooling fluid cavity 116, transmission cavity 118, first stage cavity 120, second stage cavity 122, and transmission oil cavity 124.

Housing 102 includes a thermal interface between the cooling fluid cavity and each of the motor cavity, the electronics cavity, and the oil cavity. For example, housing 102 includes a thermal interface 202 between motor cavity 110 and cooling fluid cavity 116; a thermal interface 204 between electronics cavity 112 and cooling fluid cavity 116; and a thermal interface between oil cavity 114 and, indirectly, transmission oil cavity 124, and cooling fluid cavity 116. Each of thermal interfaces 202, 204, and 206 may be configured to transfer heat from a fluid or component within the respective cavity to cooling fluid cavity 116. For example, as indicated by the various arrows, heat may be transferred from motor cavity 110, electronics cavity 112, oil cavity 114, and transmission oil cavity 124 to cooling fluid cavity 116. In this way, housing 102 may more efficiently remove and/or distribute heat generated during production of electric drive power than traction drive systems that do not integrate the various drive components.

Housing 102 also includes a structural interface 208 between transmission cavity 118 and motor cavity 110. Structural interface 208 may be configured to provide a boundary for each of motor cavity 110 and transmission cavity 118, such that a reduced amount of material may be used for each. Further, structural interface 208 may act as a thermal interface between motor cavity 110 and transmission cavity 118.

Figure 3:
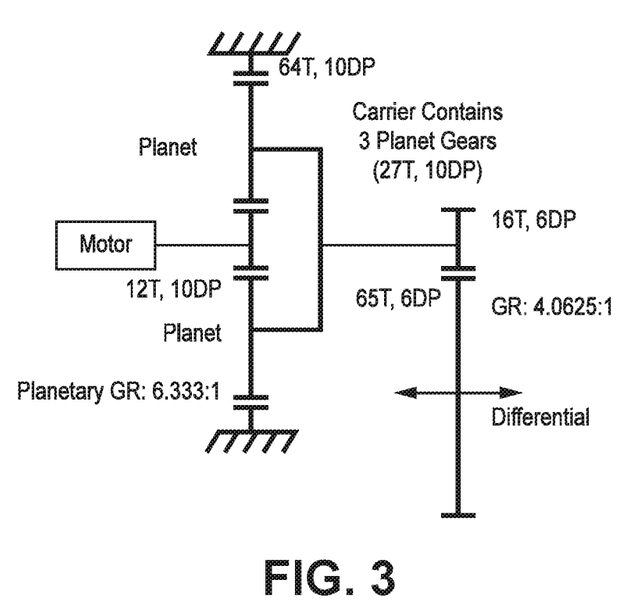
FIG. 3 is a conceptual diagram illustrating kinematics of a transmission of an example traction drive system.

FIG. 3 is a conceptual diagram illustrating kinematics of a transmission of traction drive systems discussed herein, such as transmission 108 of FIGS. 1A-1D. FIG. 3 will be described with respect to FIG. 1C. The transmission of FIG. 3 receives electric drive power from a motor operating at 30,873 RPM. The transmission includes a first stage gear assembly, such as first stage gear assembly 154 having planetary sun gear 160 and planetary ring gear 162. The planetary ring gear has 12 teeth and 10 diametral pitch, while the planetary sun gear has 64 teeth and 10 diametral pitch. Carrier shaft, such as carrier shaft 168, includes three planet gears, such as planet gears 164. The planet gears have 27 teeth and 10 diametral pitch. The first stage gear assembly has a gear ratio of 6.333:1 and an output speed of 4,875 RPM. The transmission of FIG. 3 includes a second stage gear assembly such as second stage gear assembly 156 having primary gear 166 coupled to carrier shaft 168 and differential ring gear 170 coupled to differential 158. The primary gear has 16 teeth and 6 diametral pitch, while the differential ring gear has 65 teeth and 6 diametral pitch. The second stage gear assembly has a gear ratio of 4.0625:1 and an output speed of 1200 RPM. The transmission has an overall gear ratio of 25.728:1. In this way, a high-speed output of a motor, such as motor 104 of FIGS. 1A-1D, may have a speed reduced and torque amplified.

Various examples have been described. These and other examples are within the scope of the following claims.

What is claimed is:

1. A traction drive system for a vehicle comprising:
   a housing that defines a motor cavity, an electronics cavity, an oil cavity, a transmission cavity, and a cooling fluid cavity, wherein the cooling fluid cavity is thermally coupled to each of the motor cavity, electronics cavity, and oil cavity;
   a high-speed motor that is substantially within the motor cavity;
   a motor controller comprising electronics within the electronics cavity and configured to control a speed of the motor; and
   a transmission that is substantially within the transmission cavity and mechanically coupled to the high-speed motor, wherein the transmission comprises:

a first stage gear assembly coupled to the high-speed motor;
a second stage gear assembly coupled to the first stage gear assembly; and
a differential coupled to the second stage gear assembly,
wherein the oil cavity is configured to fluidically couple to a lubricating oil system configured to supply lubricating oil to the motor and the transmission,
wherein the transmission cavity further comprises:
a first stage cavity configured to house the first stage gear assembly;
a second stage cavity configured to house the second stage gear assembly and the differential; and
a transmission oil cavity fluidically coupled to the oil cavity, and
wherein the cooling fluid cavity is configured to fluidically couple to a cooling system configured to cool the high-speed motor, the motor controller, and the lubricating oil system.

2. The traction drive system of claim 1, further comprising the lubricating oil system.

3. The traction drive system of claim 1, further comprising the cooling system.

4. The traction drive system of claim 1, wherein the high-speed motor further comprises a motor stator, a motor shaft, and a motor rotor coupled to the motor shaft.

5. The traction drive system of claim 4, wherein the motor stator is positioned in the motor cavity in an interference fit with close contact between the motor stator and a wall of the motor cavity.

6. The traction drive system of claim 4, wherein the motor shaft comprises a hollow cavity.

7. The traction drive system of claim 4, wherein the motor rotor comprises a multi-pole surface magnet arrangement.

8. The traction drive system of claim 4, further comprising a resolver coupled to the motor shaft and configured to measure a position of the motor shaft.

9. The traction drive system of claim 4, wherein the high-speed motor further comprises:
a proximal motor bearing at a proximal portion of the motor shaft; and
a distal motor bearing at a distal portion of the motor shaft.

10. The traction drive system of claim 9, wherein the high-speed motor further comprises:
a proximal shaft seal around the motor shaft between the proximal motor bearing and a proximal end of the motor rotor; and
a distal shaft seal around the motor shaft between the distal motor bearing and a distal end of the motor rotor.

11. The traction drive system of claim 1,
wherein the transmission has a gear ratio between about 12:1 and about 60:1, and
wherein a gear ratio of the first stage gear assembly is higher than a gear ratio of the second stage gear assembly.

12. The traction drive system of claim 1,
wherein a gear ratio of the first stage gear assembly is between about 4:1 and about 10:1, and
wherein a gear ratio of the second stage gear assembly is between about 3:1 and about 6:1.

13. The traction drive system of claim 1,
wherein the first stage gear assembly is a planetary gear assembly; and
wherein the second stage gear assembly is a helical gear assembly.

14. The traction drive system of claim 13,
wherein the planetary gear assembly comprises:
a planetary sun gear coupled to a motor shaft of the high-speed motor;
a planetary ring gear coupled to the housing; and
a plurality of planet gears coupled to a carrier shaft and configured to interface with the planetary sun gear and the planetary ring gear, and
wherein the helical gear assembly comprises:
a primary gear coupled to the carrier shaft; and
a differential ring gear coupled to the differential and configured to interface with the primary gear.

15. The traction drive system of claim 1, wherein the motor controller is configured to operate the high-speed motor at a maximum speed between about twelve thousand and about sixty thousand revolutions per minute.

16. The traction drive system of claim 1, wherein the housing includes a thermal interface between the cooling fluid cavity and each of the motor cavity, the electronics cavity, and the oil cavity.

17. The traction drive system of claim 1, wherein the housing includes a cold plate between the electronics cavity and the cooling fluid cavity, and wherein the motor controller is thermally coupled to the cold plate.

18. A traction drive system for a vehicle comprising:
a housing that defines a motor cavity, an electronics cavity, an oil cavity, a transmission cavity, and a cooling fluid cavity, wherein the cooling fluid cavity is thermally coupled to each of the motor cavity, electronics cavity, and oil cavity;
a high-speed motor that is substantially within the motor cavity;
a motor controller comprising electronics within the electronics cavity and configured to control a speed of the motor; and
a transmission that is substantially within the transmission cavity and mechanically coupled to the high-speed motor, wherein the transmission comprises:
a first stage gear assembly coupled to the high-speed motor;
a second stage gear assembly coupled to the first stage gear assembly; and
a differential coupled to the second stage gear assembly,
wherein the transmission has a gear ratio between about 12:1 and about 60:1,
wherein a gear ratio of the first stage gear assembly is higher than a gear ratio of the second stage gear assembly,
wherein the oil cavity is configured to fluidically couple to a lubricating oil system configured to supply lubricating oil to the motor and the transmission, and
wherein the cooling fluid cavity is configured to fluidically couple to a cooling system configured to cool the high-speed motor, the motor controller, and the lubricating oil system.

19. A traction drive system for a vehicle comprising:
a housing that defines a motor cavity, an electronics cavity, an oil cavity, a transmission cavity, and a cooling fluid cavity, wherein the cooling fluid cavity is thermally coupled to each of the motor cavity, electronics cavity, and oil cavity;
a high-speed motor that is substantially within the motor cavity;
a motor controller comprising electronics within the electronics cavity and configured to control a speed of the motor; and a transmission that is substantially within the transmission cavity and mechanically coupled to the high-speed motor, wherein the transmission comprises:
   a first stage gear assembly coupled to the high-speed motor;
   a second stage gear assembly coupled to the first stage gear assembly; and
   a differential coupled to the second stage gear assembly,
wherein a gear ratio of the first stage gear assembly is between about 4:1 and about 10:1,
wherein a gear ratio of the second stage gear assembly is between about 3:1 and about 6:1,
wherein the oil cavity is configured to fluidically couple to a lubricating oil system configured to supply lubricating oil to the motor and the transmission, and
wherein the cooling fluid cavity is configured to fluidically couple to a cooling system configured to cool the high-speed motor, the motor controller, and the lubricating oil system.

\* \* \* \* \*